United States Patent
Mere et al.

(10) Patent No.: US 9,031,717 B2
(45) Date of Patent: May 12, 2015

(54) MANAGEMENT SYSTEM FOR AIRCRAFT

(71) Applicant: Airbus Operations (SAS), Toulouse (FR)

(72) Inventors: Jean-Claude Mere, Verfeil (FR); Gilles Tatham, Pibrac (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/075,266

(22) Filed: Nov. 8, 2013

(65) Prior Publication Data

US 2014/0136027 A1    May 15, 2014

(30) Foreign Application Priority Data

Nov. 12, 2012  (FR) ...................... 12 60725

(51) Int. Cl.
*G01C 23/00* (2006.01)
*B64C 19/00* (2006.01)
*G05D 1/00* (2006.01)

(52) U.S. Cl.
CPC . *B64C 19/00* (2013.01); *G05D 1/00* (2013.01)

(58) Field of Classification Search
USPC ........................................ 701/3; 244/75–99.9
See application file for complete search history.

(56) References Cited

U.S. PATENT DOCUMENTS

| | | | |
|---|---|---|---|
| 8,024,078 B2* | 9/2011 | Coulmeau et al. | 701/3 |
| 8,527,190 B2* | 9/2013 | Mere et al. | 701/120 |
| 8,538,669 B2* | 9/2013 | Agarwal et al. | 701/120 |
| 8,548,720 B2* | 10/2013 | Shukla | 701/120 |
| 8,676,404 B2* | 3/2014 | Marty et al. | 701/3 |
| 2007/0180394 A1* | 8/2007 | Hedrick | 715/771 |
| 2007/0264617 A1* | 11/2007 | Richardson et al. | 434/30 |
| 2009/0171643 A1 | 7/2009 | Voirin et al. | |
| 2010/0280753 A1* | 11/2010 | Chytil et al. | 701/208 |
| 2011/0125400 A1* | 5/2011 | Michel et al. | 701/208 |
| 2012/0078450 A1* | 3/2012 | Marche et al. | 701/6 |
| 2012/0136562 A1* | 5/2012 | Mere et al. | 701/120 |

OTHER PUBLICATIONS

French Search Report for FR Application No. 12 60725, dated Aug. 13, 2013, Mallet, Philippe, 2 pages.
Linden, S., "The evolution of Flight Management Systems", Digital Avionics Systems Conference, (Oct. 30-Nov. 3, 1994), pp. 157-159, 14 pages.
Walter, R. et al., "The Avionics Handbook, Chapter 15: Flight Management Systems", The Avionics Handbook, (Dec. 31, 2001), 26 pages.

* cited by examiner

*Primary Examiner* — Thomas G Black
*Assistant Examiner* — Tyler Paige
(74) *Attorney, Agent, or Firm* — Nixon & Vanderhye P.C.

(57) ABSTRACT

Said system (1) comprises as least the following principal functions, a flight path management function (2), a navigation function (3) which makes it possible to calculate the position of the aircraft, a function (5) for calculation of deviations between the position of the aircraft and a flight path to be followed, a management function (6) of at least one navigation database, a management function (7) of performance calculations of the aircraft, and a function (8) of management of interfaces and of display, each of said principal functions being allocated to a specific device of the aircraft, said flight path management function (2) being linked to each of said other principal functions.

12 Claims, 1 Drawing Sheet

MANAGEMENT SYSTEM FOR AIRCRAFT

This application claims priority to France Application No. 12 60725 filed Nov. 12, 2012, the entire contents of which is hereby incorporated by reference.

The present invention relates to a management system for aircraft, in particular for a transport aeroplane, which has an optimised scalable architecture and which is capable of managing the aircraft both during the flight and during the phases on the ground, in particular at an airport.

It is known that transport aeroplanes are managed by electronic systems, the arrangement and the interactions of which obey a complex architecture. This is in particular the case with a flight management system (FMS) provided with a flight management function. This brings together a substantial number of functions, such as route planning, calculation of the flight path to be followed by the aircraft, and also calculation of the deviation with respect to this flight path, in order to correct the position of the aeroplane. Thus it offers the crew the possibility of defining, before the flight, the route to be followed, then to maintain it or even to scale it up during the flight, in order to bring the passengers to their destination.

The flight management function also has links with other functions such as the aircraft positioning calculation, the display of data in the cockpit, surveillance, communication within the aircraft and towards the exterior, as well as guidance.

However, the ever-increasing functional requirements for the conduct of the flight have led to significant developments of the flight management system which over the course of time and with new programs has become a system which is difficult to scale up. Thus, numerous functional areas have been linked to this system (navigation, guidance, decision support . . . ), involving a complexity such that any modification, even relatively minor, nowadays requires substantial effort for implementation and of verification, taking account of the associated high risk of regression, which results in a timescale for implementation and considerable costs.

Furthermore, a new requirement relating to taxiing and relating in particular to the ability to be located on an airport map, has led to the creation of a novel function of airport navigation, leading to the definition either of new avionics systems, of the OANS (onboard airport navigation system) for example, or new applications.

The time interval of these requirements, in particular the addition of the airport navigation to architectures already incorporating a flight management system, has resulted in a quasi-complete segregation of these two functions.

Specifically, within the cockpit the crew has two distinct sets of tools with two different representations, and the need to switch from one system to the other in order to manage, on the one hand, the ground part and, on the other hand, the flight part of the route to be followed.

The object of the present invention is in particular to simplify the flight management system so as to improve the flexibility, in order to be capable of proposing developments of this system in reasonable time periods and at reasonable costs, as well as effectively preparing the implementation of new functions envisaged on this system for future programs.

The object of the present invention is also to integrate, in the region of the cockpit, functions of navigation and of ground routing and management in flight. This involves stronger links, new interfaces and a need for increased synchronisation between the two systems.

A flight management system such as is considered in the present invention, includes in particular:

a navigation function which makes it possible to calculate the position of the aircraft;
a guidance function suitable for producing the guidance setpoints of the aircraft;
a function for calculation of deviations between the position of the aircraft and a flight path to be followed which is defined by the flight plan;
a surveillance function;
a data display function in the cockpit;
a communication function;
a management function of at least one navigation database;
a function for management of calculations of the aircraft performance;
a function of management of interfaces and of display; and
a flight management function.

In a conventional flight management system of the aforementioned type, the flight management function brings together not only the functions of route planning, of calculation of the flight path to be followed by the aircraft, but also those of calculation of deviations between the position of the aircraft and a flight path to be followed which is defined by the flight plan, of management of at least one navigation database, of management of performance calculations, of management of the interfaces with the flight crew and the display of the airport map, or also of management of guidance submodes, with the definition of the altitude and of the speed to be transmitted to the guidance system. Thus this multitude of functions prevents the development of the system towards new integrations including those associated with ground navigation.

The object of the present invention is to remedy this drawback. To this end, according to the invention, said management system for aircraft, comprising the following principal functions:

a flight path management function;
a navigation function which makes it possible to calculate the position of the aircraft;
a function for calculation of deviations between the position of the aircraft and a flight path to be followed;
a management function of at least one navigation database;
a function for management of calculations of the aircraft performance; and
a function of management of interfaces and of display;
is remarkable in that each of said principal functions is attributed to a specific device of the aircraft, and in that said flight path management function is linked to each of said other principal functions.

Thus, by virtue of the invention, the system architecture of the communication, navigation and surveillance systems is duplicated on the functional architecture, that is to say by accommodating each major function (calculation of position, calculation of flight path, calculation of deviations, guidance, display, surveillance, communication . . . ), in a dedicated device, which makes it possible to implement developments of the system more easily. In particular, the time periods for these developments are shorter, which gives rise to substantial savings. The simplification and the flexibility of the basic system enables the preparation of new functions more effectively and more quickly, for example in order to meet the new requirements of airline companies, or also for the future developments associated with air traffic control in the ATC environment.

Thus it is possible to take advantage of synergies between the different parts of the communication, navigation and surveillance functions implemented in the various devices of the architecture according to the invention, and to rationalise the overall implementation of these functions.

A simplification of the interfaces and of the definition of the devices relative to those in a conventional architecture is obtained.

Due to the improvement of the flexibility (capacity to evolve) of the system according to the invention, it is not necessary to scale up simultaneously the numerous systems of the conventional architecture involved in the communication, navigation and surveillance functions.

Within the scope of the present invention, the flight path management function has not only a function of calculation of the flight path of the aircraft, but also a function of defining the flight plan. Thus this function brings together only a part of the functions usually allocated to a flight management system (FMS).

Each principal function preferably comprises a software application accommodated on a modular avionics card.

Therefore each function is managed by a separate software application in order to avoid having to scale up an application relating to a plurality of functions, whilst the modification only relates to one. The identification of the modular cards currently used in aviation is also simpler, in particular in the event of problems associated with a specific function.

Also, advantageously, said system also includes the following principal functions:
 a surveillance function; and
 a communication function.

Advantageously, each function can be taken care of by an integrated system designed and dedicated therefor, such that it is as effective as possible.

Nevertheless, the functions may also be attributed to existing systems already operational on an aircraft, which makes it possible in particular to reduce the size thereof. Thus, according to different embodiments which could be taken together or separately:
 the function of calculation of deviations is allocated to a multi-mode receiver,
 the navigation function is allocated to a central inertial reference unit,
 the system comprises a guidance function allocated to a guidance calculator,
 the navigation database management function is allocated to a data server,
 the function of management of performance calculations is allocated to a centralised calculation service, and
 the management of interfaces and of display is allocated to a display device.

In a preferred embodiment, the flight path management function is configured in order also to manage the phases proceeding on the ground.

The flight path management function preferably comprises a management function of the complete route on the ground and in flight.

Thus the invention makes it possible to rationalise the implementation of the envisaged developments on the airport navigation system, by making the best use of the synergies between the two systems, and to rely on the proven algorithms of the flight management system in order to limit the complexity induced by the envisaged developments on this airport navigation system.

Also, in an advantageous manner the flight path management function comprises a function of management of the route plan on the ground and in flight. In other words, the system establishes a complete route plan also comprising the parts on the ground, from the departure point, at the boarding gate of a first airport for example, to the arrival point, at the arrival gate of another airport.

The flight path management function advantageously comprises a function of calculation of the flight path on the ground and in flight. This function is capable of calculating the flight path of the aircraft both on the ground and in flight, the pilot only having a single instrument available rather than two different ones as for a conventional architecture. In addition, the control panel of the cockpit saves space.

In this preferred embodiment, the flight path management function is responsible for the management of the route plan and of the flight path to be followed for all the phases of the operation of the aircraft on the ground and in flight, including the current flight management system functions of planning and of calculation of the flight path, the functions, currently in the course of development, of routing and of calculation of the route on the ground of the airport navigation system as well as a new function of ground/flight continuity.

The complete route management function brings together the tasks of synchronisation of the ground and flight parts of the route to be followed in order to ensure the coherence of the common parts and the continuity of the predictions, for example the arrival time and the quantity of fuel available at the different points on the route. It also enables co-ordination of the modifications and the updates of the complete route, the management of temporary or secondary routes and their links to the active route, or also the memorisation or storage of the different routes for use by other functions or systems of the aircraft.

It also brings together the crossed surveillance and verification parameters between the different instances of calculation of the flight path in order to improve the availability and the integrity of data relating to the route to be followed on the ground and in flight.

Thus this preferred embodiment makes it possible to implement a concept of ground/flight continuity and of mission surveillance from the boarding gate to the arrival gate.

The invention also relates to an aircraft, in particular a transport aeroplane, having a management system such as that described previously.

The figures of the appended drawings will give a good understanding of how the invention can be illustrated. In these drawings, identical references designate similar elements.

Figure 1:
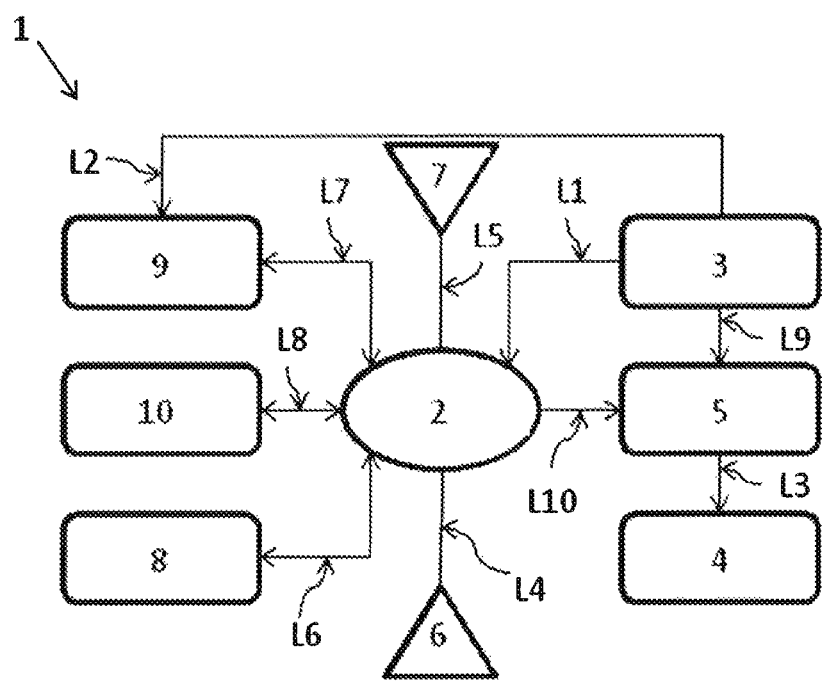
FIG. 1 shows a block diagram of a management system according to the invention.

In FIG. 1, the management system 1 comprises a flight path management function 2 which includes integrated means for determining conventionally at least one flight path of the aircraft, with the aid in particular of data received from a navigation database, and also data received from a set of conventional data sources. The flight path management function 2 also has the object of defining the flight plan which the aircraft will follow as a function of different parameters and data received. Said system 1 also comprises the following other principal functions:
 a navigation function 3 which makes it possible to calculate the position of the aircraft;
 a function 5 for calculation of deviations between the position of the aircraft and a flight path to be followed. The position of the aircraft is received by the navigation function 3, and is compared to a position conforming to the flight plan provided by the flight path management function 2 in order to provide a guidance function 4 with a flight path correction to be applied to the aircraft;
 a management function 6 of at least one navigation database configured to provide the flight path management function 2 with the conventional route plans in order to produce a route and a flight path to be followed;

a management function 7 for calculation of performance of the aircraft, linked to the flight path management function 2, in order to provide other parameters linked to the performance of the aircraft which are capable of contributing to the choice of the route and of the flight path; and an interface and display management function 8, such as a conventional control and display system (CDS), which is capable of displaying on at least one display screen (not shown) information received from said flight path management function 2, and in particular the flight path produced by this flight path management function 2.

According to the invention, each principal function is allocated to a specific device of the aircraft, and the flight path management function 2 is linked to each of said other principal functions. Some main functions may also be interconnected.

Thus:

the navigation function 3 transmits the position to the flight path management function 2 via a link L1, and also to the surveillance function 9 via another link L2, and to the deviations calculation function 5 via a link L9;

the function 5 for calculation of deviations between the position of the aircraft and a flight path to be followed supplies a guidance function 4 with the flight path correction via a link L3, based on the positions given by the flight path management function 2 via the link L10, and by the navigation function 3 via the link L9;

the function 6 for management of at least one navigation database is linked via a link L4 to said flight path management function 2;

the performance calculation management function 7 is linked via a link L5 to said flight path management function 2; and the interface and display management function 8 is linked via a link L6 to said Flight path management function 2.

Furthermore, the system 1 comprises a guidance function 4 which is capable of producing of guidance setpoints for the aircraft, and which performs processing intended for guidance of the aircraft along the flight path. It also comprises conventional means for actuation of control elements of the aircraft, for example of control surfaces (yaw, pitch, roll) of said aircraft. Said actuation means receive guidance orders and actuate said control elements in a corresponding manner. Said guidance function 4 is linked to the deviations calculation function 5 by said link L3.

This simple and flexible architecture makes it possible to prepare new functions in a more effective and quicker manner, and to maximise the overall performance of the system.

The system 1 also includes a surveillance function 9 and a communication function 10.

The conventional surveillance function 9, for example of the AESS (aircraft environment surveillance system) type, is intended to monitor the environment of the aircraft, carrying out processing operations on the basis of the flight path received by said flight path management function 2 by means of a link L7. This surveillance function 9 monitors performance parameters relating to the position provided by the navigation function. It is also linked to the navigation function 3 via said link L2.

The communication function 10 enables exchanges with interlocutors outside or inside the aircraft. It is linked to the flight path management function 2 via a link L8, in order to pass to it information provided by a control tower, for example.

Each of said principal functions comprises a software application accommodated on a modular avionics card.

A multi-mode receiver executes the deviations calculation function 5. This receiver, of the MMR (multi-mode receiver) type, is capable of integrating radionavigation systems, such as ILS (instrument landing system), MLS (microwave landing system) and GPS (GPS landing system).

The navigation function 3 is implemented by an ADIRS (air data inertial reference system) type system, which produces inertial position data in the conventional way, which also receives position data of the aircraft, and which, using the position data received and the inertial position data produced, determines a position of the aircraft.

Furthermore, the guidance function 4 is linked by means of the link L3 to the deviations calculation function 5. A guidance calculator executes this function. It can act as a flight calculator, for example of the FG (flight guidance) type.

A data server manages the navigation database 6.

Moreover, a centralised calculation service within the aircraft manages the performance calculations management function 7.

Furthermore, the interface and display management function 8 is operated by a display device.

In a preferred embodiment, the flight path management function 2 also manages the phases proceeding on the ground.

Figure 2:
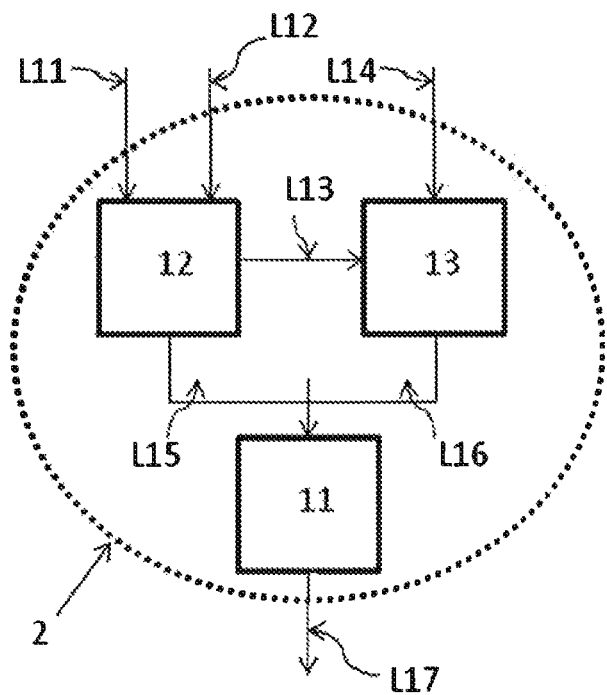
FIG. 2 illustrates schematically the functional architecture of a preferred embodiment of a management function according to the invention.

In this preferred embodiment, the flight path management function 2 includes, as shown in FIG. 2:

a management function 12 of the route plan on the ground and in flight, which receives navigation data via a link L11, and data relating to the airport via another link L12;

a function 13 of calculation of the route on the ground and in flight, which receives data from the management function 12 of the route plan on the ground and in flight via a link L13, and performance data via a second link L14, in order to calculate the flight path to be followed by the aircraft;

a management function 11 of the complete route on the ground and in flight, which is linked to the flight path calculation function 13 via a link L16, and to the route plan management function 12 via another link L15. A link L17 enables the flight path management function 2 to be connected to other functions of the system 1.

Thus, this architecture permits in particular a synchronisation of the ground and flight parts of the route to be followed in order to ensure the coherence of the common parts and the continuity of the predictions, such as the arrival time and the quantity of fuel available.

The implementation of this novel concept of ground/flight continuity scales up the functional perimeters of the two current flight and airport navigation management systems in order to result in an architecture which is optimised in terms of flexibility of the systems of which it consists and with respect to its overall performance.

The invention claimed is:

1. A flight management system on board an aircraft including a computer system executing instructions stored on non-transitory memory, the execution of the instructions causes the flight management system to:

manage a flight path by tracking the actual flight path of the aircraft;

determine the current position of the aircraft during flight, wherein the calculation includes communicating with a navigation system on the aircraft;

manage at least one navigation database wherein the database includes ground maps of airports identifying locations of airport gates and runways;

generate a route plan including ground and air paths for the aircraft to travel from a departure gate to an arrival gate;

calculate deviations between the current position of the aircraft in flight and the air path of the route plan;

determine the position of the aircraft while on the ground, including determining the position of the aircraft at an airport using the airport maps;

determine a route for the aircraft while at a departure airport to taxi from the departure gate to a selected runway using one of the ground paths of the route plan;

determine a route for the aircraft while at an arrival airport to taxi from a landing runway to the arrival gate using one of the ground paths, and generate presentations indicating the determined routes which are displayed on a display device in a flight deck of the aircraft.

2. The system according to claim 1, wherein the execution of the instructions further causes the flight management system to:

manage a surveillance device on the aircraft monitoring an environmental condition of the aircraft; and manage communications between flight management system and a control tower system external to the aircraft.

3. The system according to claim 1, wherein the calculation of deviations is performed using a multi-mode receiver.

4. The system according to claim 1, wherein the determination of the current position of the aircraft is performed using a central inertial reference unit.

5. The system according to claim 1, wherein the execution of the instructions further causes the flight management system to determine guidance set points for the aircraft using a guidance calculator.

6. The system according to claim 1, wherein the navigation database is allocated to a data server.

7. The system according to claim 1, wherein the execution of the instructions further causes the flight management system to calculate a performance factor of the aircraft using a centralised calculation system.

8. The system according to claim 1, wherein the generation of presentations includes managing the display device.

9. The system according to claim 1 wherein the system is included in an aircraft.

10. The system according to claim 1, wherein the computer system includes modular avionics cards.

11. The system according to claim 1, wherein each of the executed instructions is managed by a separate device.

12. The system according to claim 1, wherein the flight management system is connected to a plurality of separate devices, each tasked with executing one of the instructions.

* * * * *